United States Patent Office.

HENRY FRANCIS SMITH, OF LONDON, ASSIGNOR TO JAMES BUCKINGHAM, OF WALWORTH, ENGLAND.

Letters Patent No. 86,784, dated February 9, 1869.

---

IMPROVEMENT IN COATING AND WATER-PROOFING WOVEN FABRICS.

---

The Schedule referred to in these Letters Patent and making part of the same

---

*To all whom it may concern:*

Be it known that I, HENRY FRANCIS SMITH, of London, England, have invented certain "new and improved Means for Water-Proofing and Preserving Woven Fabrics;" and I do hereby declare that the following is a full and exact description thereof.

This invention relates to a novel means for rendering woven fabrics impervious to moisture, and for preserving them from decay, and is chiefly designed for application to hose-pipes, tarpauling, covers for carriages, stacks, and other articles for similar purposes.

The said invention consists chiefly in the application to a woven fabric of the following composition, whose ingredients must be thoroughly incorporated together before being applied to the fabric.

The said composition consists mainly of linseed or other vegetable oil, either in a raw, boiled, or previously-oxidized state, and caoutchouc, or India rubber, previously dissolved in mineral naphtha, or other solvent.

These ingredients are combined in the proportion of about one gallon of the oil to two pounds of caoutchouc.

To this mixture I usually add about two pounds of any ordinary resin.

These proportions may be varied according to the nature of the fabric, or to the use to which it is to be applied.

When raw oil is used, I add about two pounds of litherage, litharge, or similar preparations of lead, or other suitable drying-material. Coloring-matters may be also added in any required quantities.

The said composition being applied to the surface of the woven fabric, and caused to permeate the same, when dry will render the said fabric impervious to moisture, and prevent its becoming rotten.

Although I have given a preference to the use of linseed-oil, from its better drying-properties, yet I am aware that other vegetable oils, having drying-properties, may be used for the aforesaid purpose.

To accelerate the process of drying, and in order that the oxidation of the oils may not take place after their application to any fabric, I prefer to oxidize the oils before such application, and this oxidation may be effected by well-known means.

The oxidized oil is treated with any suitable solvent, and in such instances the addition of litharge, or other "driers," as before given, is not necessary.

For some purposes my improved composition may consist entirely of the India rubber and oxidized oil, without the admixture of resin.

A solution of oxidized oil alone may be sometimes used to first coat or permeate the fabric.

What I claim, and desire to secure by Letters Patent, is—

A flexible water-proof material, obtained by the application and combination of a composition of vegetable oil, India rubber, and resin, to a suitable woven fabric, substantially in the manner herein set forth.

HENRY FRANCIS SMITH.

Witnesses:
   THOS. N. PALMER,
   GEORGE HASELTINE,
      "*International Patent Office,*"
         8 Southampton Buildings,
            London, England.